United States Patent [19]

Swyst et al.

[11] Patent Number: 5,979,764
[45] Date of Patent: Nov. 9, 1999

[54] HAND-HELD ELECTRONIC APPARATUS WITH PIVOTING DISPLAY

[75] Inventors: Thomas Swyst, Arlington; David Honan, Concord; Alan D. Ball, Arlington; Andrew Philip Tosh, Jamaica Plain, all of Mass.; Philip Swift, Port Jefferson, N.Y.; Jonathan Marks, Cambridge, Mass.; Margaret Hetfield, East Northport, N.Y.; Lee Raymond, Seaford, N.Y.; Richard Isaac, East Northport, N.Y.

[73] Assignee: Symbol Technologies, Inc., Holtsville, N.Y.

[21] Appl. No.: 08/681,114

[22] Filed: Jul. 22, 1996

[51] Int. Cl.$^6$ .................................................. G06K 7/10
[52] U.S. Cl. ............................ 235/462.2; 235/462.43; 345/905
[58] Field of Search .......................... 345/905; 235/472, 235/462.2, 462.43, 462.47; 349/58; 348/794, 333; 248/542; 396/374, 383

[56] References Cited

U.S. PATENT DOCUMENTS

| | | | |
|---|---|---|---|
| 4,814,759 | 3/1989 | Gombrich et al. | 340/771 |
| 4,983,818 | 1/1991 | Knowles | 235/472 |
| 5,140,141 | 8/1992 | Inagaki et al. | 235/462 |
| 5,144,120 | 9/1992 | Krichever et al. | 235/472 |
| 5,249,103 | 9/1993 | Forsythe | 361/730 |
| 5,259,584 | 11/1993 | Wainwright | 248/542 |
| 5,371,348 | 12/1994 | Kumar et al. | 235/472 |
| 5,478,998 | 12/1995 | Charych et al. | 235/462 |
| 5,539,194 | 7/1996 | Miller et al. | 235/472 |
| 5,589,849 | 12/1996 | Ditzik | 345/905 |
| 5,623,709 | 4/1997 | Kaji | 248/542 |
| 5,654,534 | 8/1997 | Coleman . | |
| 5,659,361 | 8/1997 | Jin | 348/75 |
| 5,719,645 | 2/1998 | Saito et al. | 348/818 |
| 5,742,341 | 4/1998 | Ohishi et al. | 348/333 |
| 5,796,088 | 8/1998 | Wall | 235/472 |

*Primary Examiner*—Donald Hajec
*Assistant Examiner*—Mark Tremblay
*Attorney, Agent, or Firm*—Kirchstein, et al.

[57] ABSTRACT

An electronic apparatus such as a computer terminal, video camcorder, portable picture phone or a bar code reader includes a display which is arranged to pivot so as to provide optimum ease of viewing for the user. A reader such as an optical scanner for scanning indicia, for example bar code symbols, comprises a handle portion and, mounted pivotally thereon, a head portion. The angle of the head portion relative to the handle portion can be adjusted by rotating the head portion as desired. The reader can thus be used to read bar code symbols that would otherwise be inaccessible. In an alternative embodiment a reading head is mounted pivotally on a fixed terminal and is movable so as to accommodate the physical requirements of the operator.

20 Claims, 11 Drawing Sheets

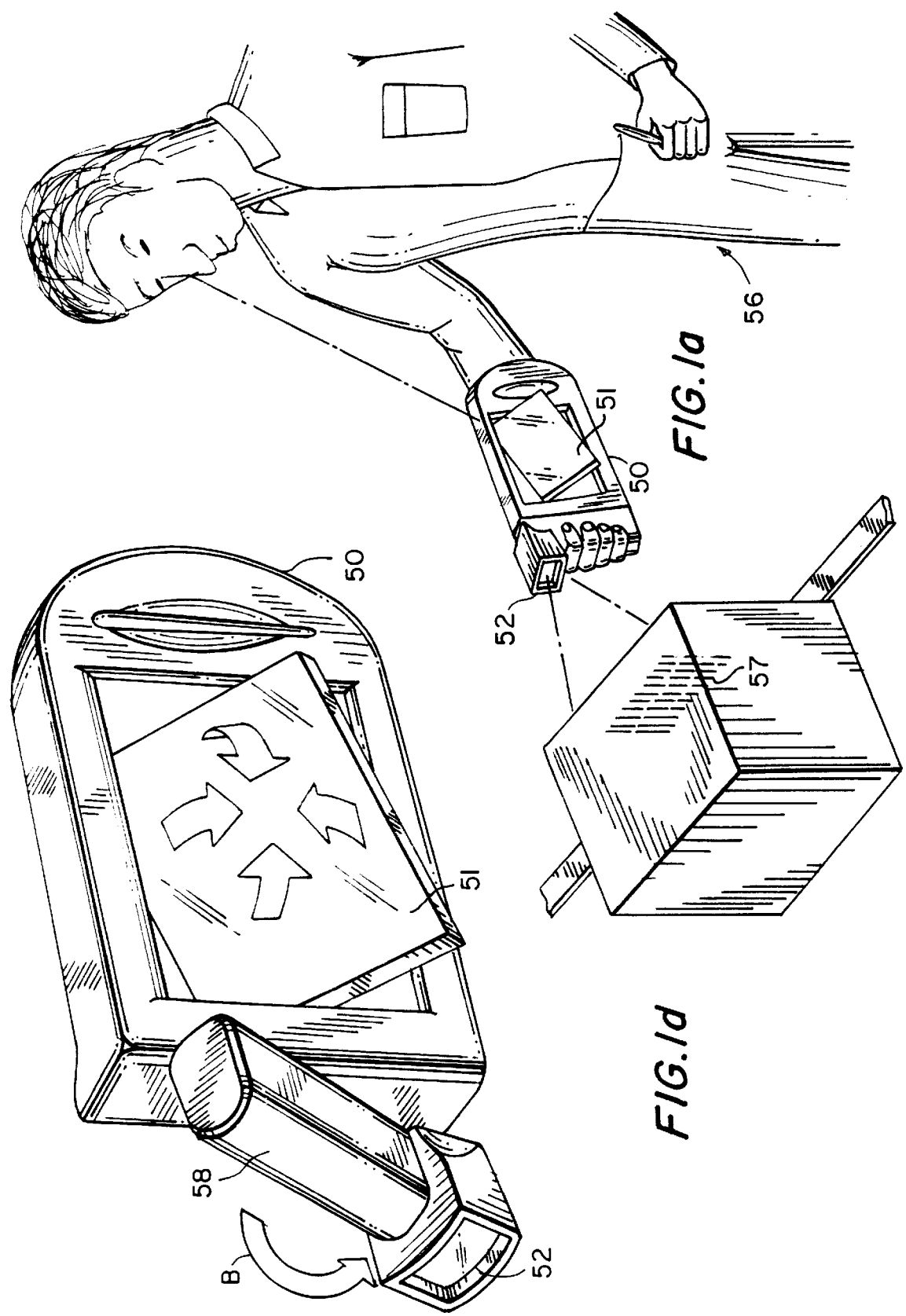

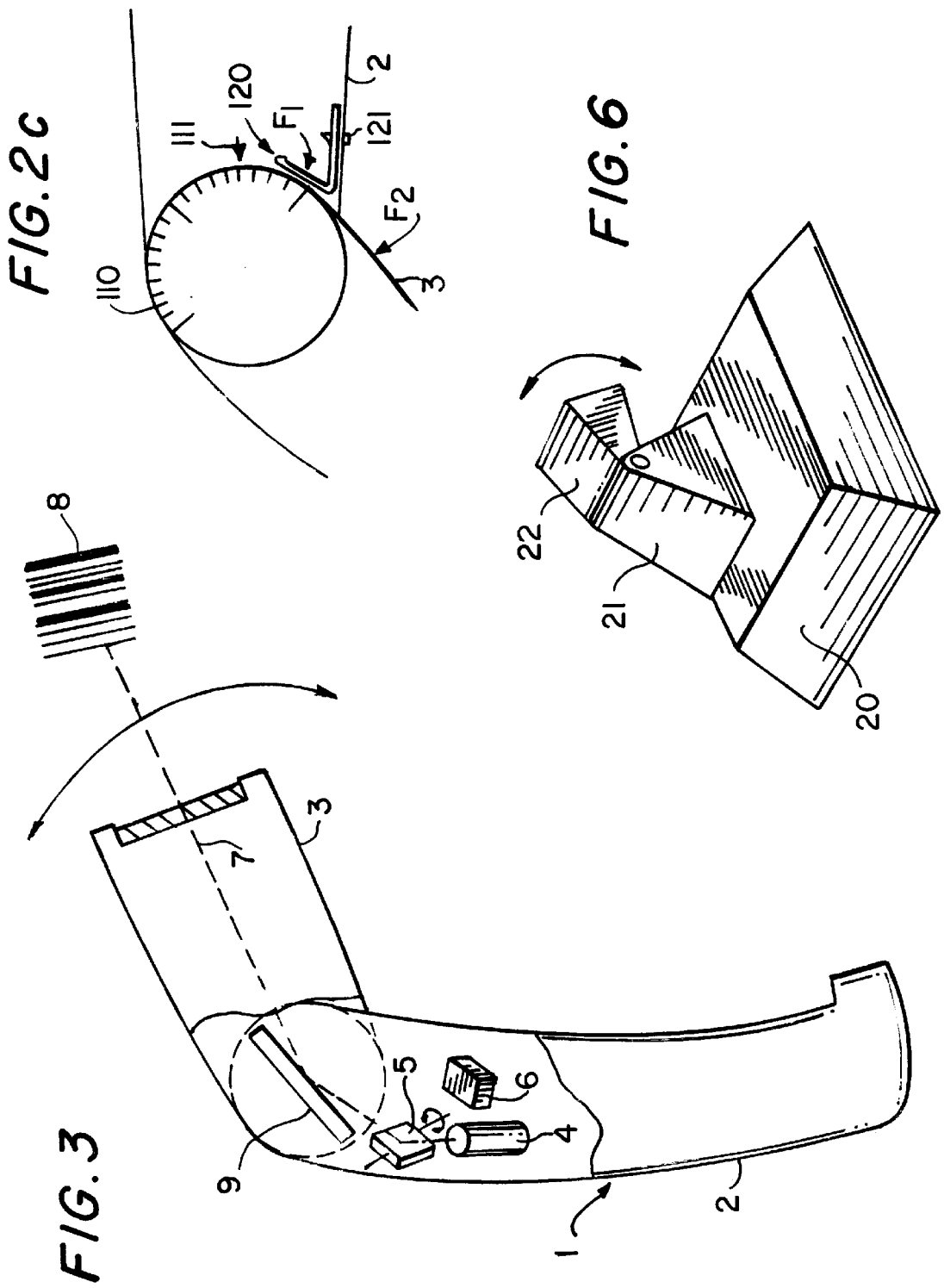

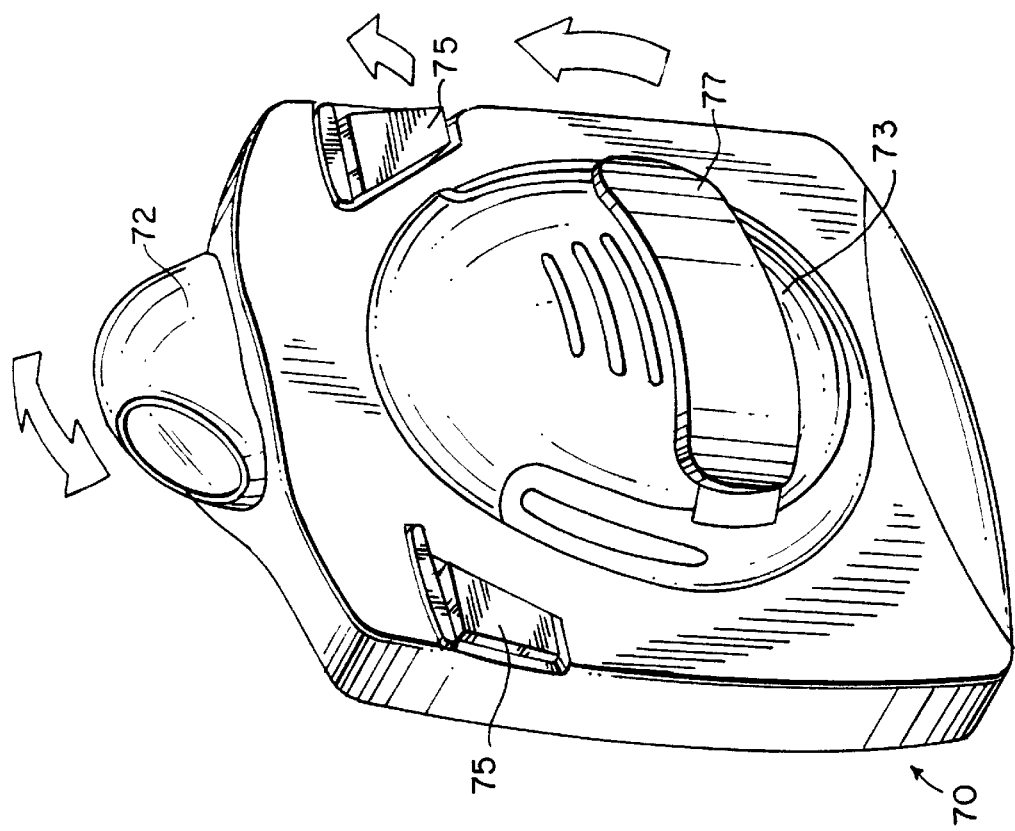
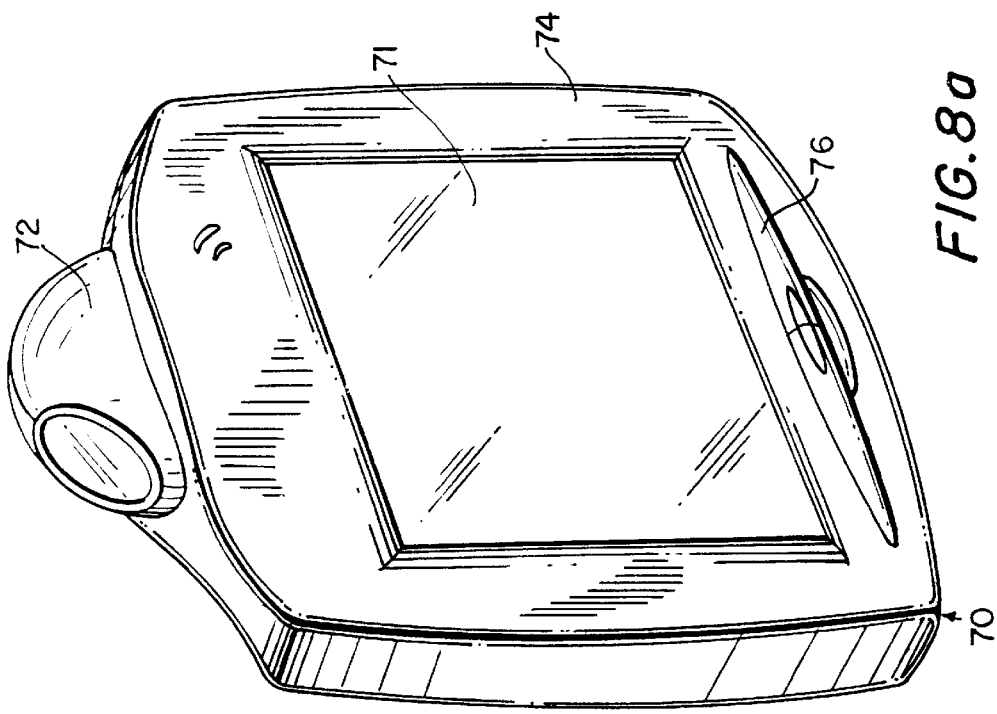

HAND-HELD ELECTRONIC APPARATUS WITH PIVOTING DISPLAY

BACKGROUND OF THE INVENTION

Field of the Invention

The invention relates generally to electronic apparatus such as a computer terminal, a video camcorder, a portable picture phone or a bar code reader, the apparatus including a display.

A wide variety of electronic apparatus is now available including a display. Such apparatus includes computer terminals, video camcorders, portable picture phones and bar code readers. It is known in, for example, conventional computer terminals to have a base including the processing parts and, separately therefrom, a display monitor. The monitor is generally either movable as a whole, or arranged to pivot or otherwise rotate.

In many cases it is now desired to design electronic apparatus in a portable or hand-held mode, or a lap-top mode. In such cases various constraints are placed on the apparatus, for example size and weight constraints, and ergonomic constraints. The size and weight constraints demand that light-weight modules are preferred with a minimum of complex mechanical components that could give rise to unnecessary bulk or weight. The ergonomic constraints mean that the display must be designed to be carried or held with ease and comfort.

These ergonomic constraints often demand that the display be positioned with optimum efficiency on the apparatus, but to the detriment of the user. For example the user may have to crane his neck, or tilt the display to an uncomfortable position leading to discomfort in the short term and possible physical damage in the long term. In addition it may be desired to position the display such that a third party may view it, or so that it can be viewed regardless of the lighting conditions.

Because of the weight and size constraints, however, the conventional methods of positioning the display are inappropriate.

It is recognized that the provision of a display on a bar code reader terminal may assist the operator in entering information or operational parameters, or reading directly information obtained by the bar code reader or relating to its performance. The ergonomic constraints in a bar code reader are especially important as it must be shaped to allow the easy pointing of the reader portion at a bar code symbol to be read, while allowing the user to view the display screen easily and comfortably.

Various readers and optical scanning systems have been developed for reading printed indicia such as bar code symbols appearing on a label or the surface of an article and providing information concerning the article such as the price or nature of the article. The bar code symbol itself is a coded pattern of indicia comprised of, for example, a series of bars of various widths spaced apart from one another to form spaces of various widths, the bars and spaces having different light reflecting characteristics. The readers electro-optically transform the graphic indicia into electrical signals which are decoded into alpha-numeric characters that are intended to be descriptive of the article or a characteristic thereof. Such characters typically are represented in digital form, and utilized as an input to a data processing system for applications in point of sale processing, inventory control and the like.

Known scanning systems comprise a light source for generating a light beam incident on a bar code symbol and a light receiver for receiving the reflected light and decoding the information contained in the bar code symbol accordingly. The readers may comprise a flying spot scanning system wherein the light beam is scanned rapidly across a bar code symbol to be read or a fixed field of view reading system wherein the bar code symbol to be read is illuminated as a whole and a CCD (Charge Coupled Device) array is provided for detecting the light reflected from the bar code symbol. The reader may be either a hand-held device or a surface-mounted fixed terminal.

U.S. patent application Ser. No. 08/366,383 filed Dec. 29, 1994 and commonly assigned herewith relates to an optical scanner including a mounting portion and a scanning portion, a light source, mirror and detector being mounted in the scanning portion, wherein the scanning portion comprises a substantially spherical housing mounted in a complementary socket in the mounting portion to effectively form a ball-joint.

U.S. Pat. No. 5,367,152 which is commonly assigned herewith relates to a bar code symbol scanning system wherein scanning of the laser beam is achieved by the rapid oscillation of a laser diode and wherein the scanning beam is directed towards the target by a stationary mirror. The stationary mirror is provided on a cover portion to the scanning system which may be detached from the scanning system and re-attached in a position rotated about the longitudinal axis of the scanning system from the original position in order to direct the scanning beam in a different direction.

U.S. Pat. No. 5,418,684 assigned to Norand Corporation discloses a hand-held data collection terminal unit of modular construction. One of the modules comprises a scanning head which is rotatably or pivotably attached to the scanner module to pivot about the longitudinal central axis through the terminal unit. Alternatively, a fixed scanning head having a directional scanning at an angle of 45° from the longitudinal axis may be provided.

U.S. Pat. No. 5,477,044 relates to a hand-held symbology reader including a handle and a head with a reading module therein. The reading module is rotatably mounted within the head and the head may be further rotatably mounted by a ball and socket-type joint upon the handle. The reader is designed so as to be oriented to read a bar code symbol at any orientation on a facing surface of an item.

In some cases known readers are not ideally suited for reading bar code symbols on certain types of goods, or in certain situations. For example, when taking the inventory of goods in a warehouse where certain of the goods are unwieldy, or located in inaccessible positions it may be difficult to read bar code symbols on the goods using a hand-held bar code scanner without considerable exertion or contortion of the reader operator. Similarly, where a bar code reader is provided in a fixed terminal, for example at the point of sale, it is generally necessary for the operator to "sweep" a product bearing a bar code past the reading head on the terminal. In some cases, however, the reading head of the terminal may not be in an optimum position, or may not be directed at an optimum inclination for the operator's physical requirements. The operator will, therefore, be required to stretch or twist more than is necessary or desirable which may give rise inter alia to repetitive strain injuries. Although it is possible to provide differently configured bar code readers dependent on the uses to which they will be put, such an approach is clearly costly and may require careful planning as to which readers are to be used in certain applications requiring overly complex preparation.

SUMMARY OF THE INVENTION

Objects of the Invention

It is an object of the present invention at least to alleviate the problems of the prior art.

It is a further object of the present invention to provide an electronic apparatus having a display that is simply and comfortably readable by the user.

It is a further object to provide a hand-held reader capable of reading bar code symbols in positions difficult to access.

It is a further object of the invention to provide a fixed bar code reader capable of reading bar code symbols in positions difficult to access.

FEATURES OF THE PRESENT INVENTION

According to the invention there is provided an optical reader comprising: a body having a gripping portion arranged to be held in a user's hand, the body having a reader portion for reading an information element and a display screen wherein the reader portion is situated on the body to allow aiming of the reader portion at an information element when the body is held in the user's hand and the display screen is arranged to pivot relative to the body for the user's ease of viewing when holding the gripping portion.

Accordingly the reader may be comfortably held in the user's hand and aimed by the user's natural ability to aim, whilst avoiding discomfort to the user when viewing the display screen. As a result a highly effective "view and shoot" system is provided.

Preferably there is provided an optical reader in which the body includes a pair of opposing broad faces one of which is arranged to contact the user's palm when held in the user's hand and the other of which carries the display screen, and in which the reader portion extends transverse to the broad faces defining an aiming direction parallel with the broad faces.

According to the invention there is provided an electronic apparatus, comprising: a body having a gripping portion arranged to be held in the user's hand, the body having a broad face and a display screen provided on the broad face; the display screen being arranged to pivot relative to the broad face for the user's ease of viewing when holding the gripping portion. The apparatus may comprise an optical reader further including a reader portion, and the reader portion may be arranged to pivot relative to the body of the electronic apparatus. The invention thus allows the user to pivot the display screen to the desired angle to avoid discomfort to the user.

According to a further aspect of the invention there is provided an optical reader for reading graphical indicia comprising: a light source for illuminating an indicia; a light detector for detecting light reflected by the indicia; a mounting portion; and a reading head portion pivotally mounted on the mounting portion. By pivoting the reading head portion to a desired position, awkwardly placed bar code symbols or other indicia can be read.

The mounting portion may have a longitudinal axis and the reading head portion may be pivotally mounted about an axis perpendicular to said longitudinal axis allowing further improved access to awkwardly positioned indicia. The reading head portion may be manually movable relative to the mounting portion. Alternatively the reading head portion may be movable relative to the mounting portion by means of a motor controlled by the operator.

The mounting portion and reading head portion may be calibrated to indicate the angle of the reading head portion relative to the mounting portion, to assist in configuring the reader. A biasing element may provide resistance to rotation of the reading head portion relative to the mounting portion.

The reader may be a hand-held reader and the mounting portion may comprise a handle portion.

The mounting portion may comprise a fixed terminal.

According to the invention there is further provided an optical scanner for reading graphic indicia comprising: a light source for scanning a beam across an indicia; a light detector for receiving light reflected by the indicia; a handle portion; and a scanning head portion mounted pivotally on the handle portion.

The light source and light detector may be provided in the handle portion and a mirror may be provided rotatable with the scanning head portion to direct light through the scanning head portion between the light source and detector and the indicia to be scanned. Alternatively the light source and light detector may be provided in the scanning head portion.

According to the invention there is further provided a field of view optical reader for reading graphic indicia comprising: a light source for illuminating an indicia; a detector for receiving light reflected from the indicia; a handle portion; and a reading head portion mounted pivotally on the handle portion.

The light source and light detector may be provided in the handle portion and a mirror may be provided rotatable with the reading head portion to direct light between the light source and detector and the indicia to be scanned. Alternatively the light source and detector may be provided in the reading head portion.

According to the invention there is yet further provided an optical reader for reading graphic indicia comprising a light source for illuminating an indicia and a light detector for detecting light reflected by the indicia wherein the reader comprises a fixed terminal and a reading head portion and wherein the reading head portion is mounted pivotally on the fixed terminal. The reader may comprise an optical scanner or a field of view optical reader.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 1a shows an electronic apparatus according to the invention in use;

FIG. 1d shows an alternative electronic apparatus;

FIG. 2b is a cut-away perspective view of the reader of FIG. 2a;

FIG. 2c is an expanded partial view of the reader of FIG. 2a;

FIG. 3 is a cut-away side view of a reader according to still another embodiment of the present invention;

FIG. 6 is a perspective view of another embodiment of the invention;

FIG. 8a is a perspective view of an electronic apparatus according to another embodiment of the invention from one side;

FIG. 8b is a perspective view of the embodiment of FIG. 8a from the other side;

FIG. 11b is an exploded cross-sectional view of a portion of the view shown in FIG. 11a.

DETAILED DESCRIPTION OF THE PREFERRED EMBODIMENTS

Figure 1B:
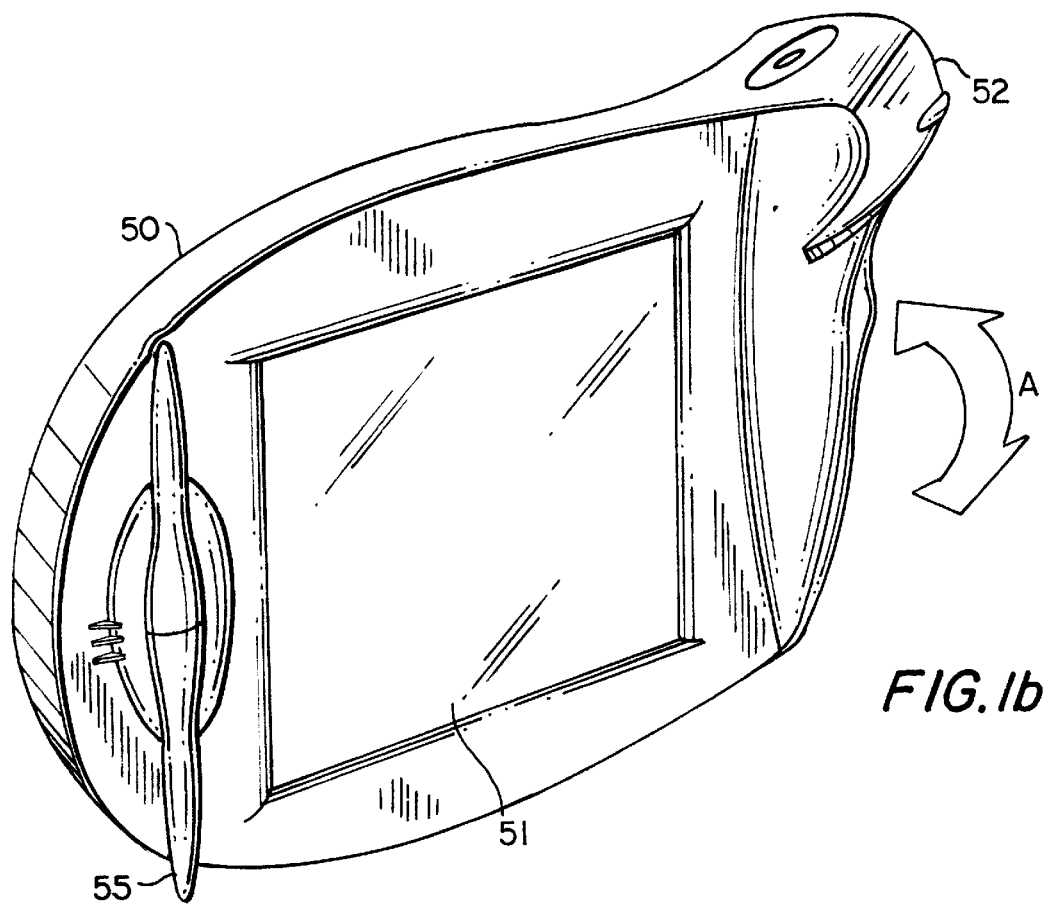
FIG. 1b is a perspective view of one embodiment of an electronic apparatus according to the invention from one side.
Figure 1C:
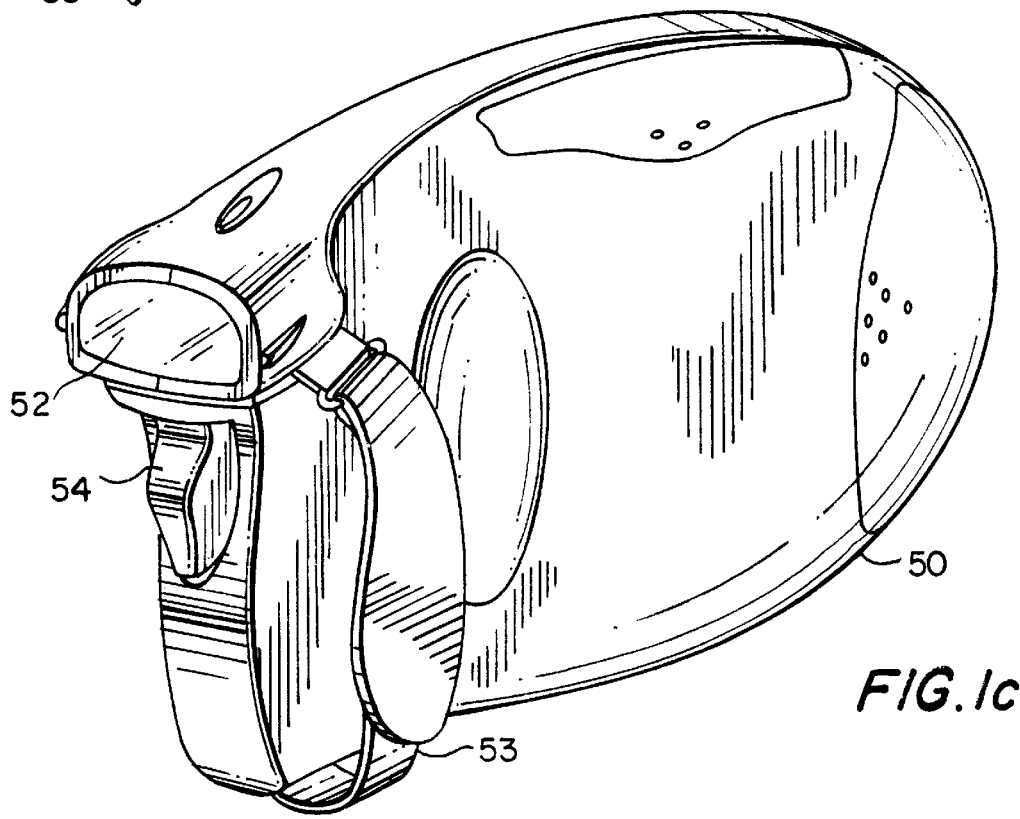
FIG. 1c is a perspective view of the embodiment of FIG. 1a from the other side.

Referring firstly to FIGS. 1a to 1e, an electronic apparatus is shown generally at 50. The electronic apparatus shown includes a display screen 51, for example an LCD display and a light receiving portion 52. The light receiving portion 52 could be a camera in the case where the electronic apparatus 50 was a video camcorder, or a bar code reader portion where the apparatus was a bar code reader. In either case, it will be seen that the apparatus is shaped to be pointed at a target either to be read or recorded, and information is then displayed on the screen 51. In the case of a camcorder the picture received by the camera 52 will be shown on the display 51. In the case of a bar code reader information as to the operation of the system, or the nature of the bar code symbol scanned will be displayed.

For the purposes of this discussion the operation of the apparatus as a bar code reader will be described although it will be appreciated that the description will apply equally well, where appropriate, to the apparatus' operation as a video camcorder or any other suitable electronic apparatus.

The body of the bar code reader 50 is substantially oval when viewed from the side, in the direction of the viewing screen 51. The bar code reader portion 52 is provided at the front top of the body. The reader 50 is shaped such that the rear oval face opposed to the screen carrying face fits against the palm of the hand of the user, the user's fingers wrapping around the front part of the body 50 below the reader portion 52. A strap 53 is provided at the frontward part of the rear oval face below the reading portion 52 through which the user's fingers pass. A trigger 54 is positioned directly below the reader portion 52 for operation by the user to actuate the bar code reader. A pen 55 may optionally be included, for example, for allowing the user to write on a suitably configured touch screen 51 to input information to the system. The pen is conveniently held on the body 50 by suitable retaining means such as a magnet or a hook and loop fastening means, next to the screen 51.

The user holds the bar code reader 50 in one hand such that the oval faces are aligned with the vertical plane and the reader portion 52 points away from the user in order to retain the reader portion 52 at the correct orientation. Accordingly the user's hand will be oriented vertically as will the screen 51. It will be appreciated that this may not be the optimum orientation for the screen 51 if the user wishes to read the screen comfortably and efficiently. The user will not, however, wish to have to tilt his hand, and hence the apparatus as a whole both because this will lead to discomfort and because operation of the reader as a whole may be affected.

Accordingly the screen 51 is arranged to be pivotable about its central horizontal axis (when held in the reading position). The pivoting direction is designated by arrow A in FIG. 1b. Accordingly the user can orient the screen to a desired angle for ease of view.

This can be best seen in FIG. 1a in which a user 56 holds the body 50 in the palm of his hand with his fingers wrapped around the lower frontward portion of the body 50. The reader portion 52 is thus simply and accurately aimed at a bar code symbol 57. At the same time the screen 51 is pivoted to a desired orientation in order that the user can view it with minimum difficulty and discomfort. This gives rise to a highly effective "view and shoot" system.

Figure 11A:
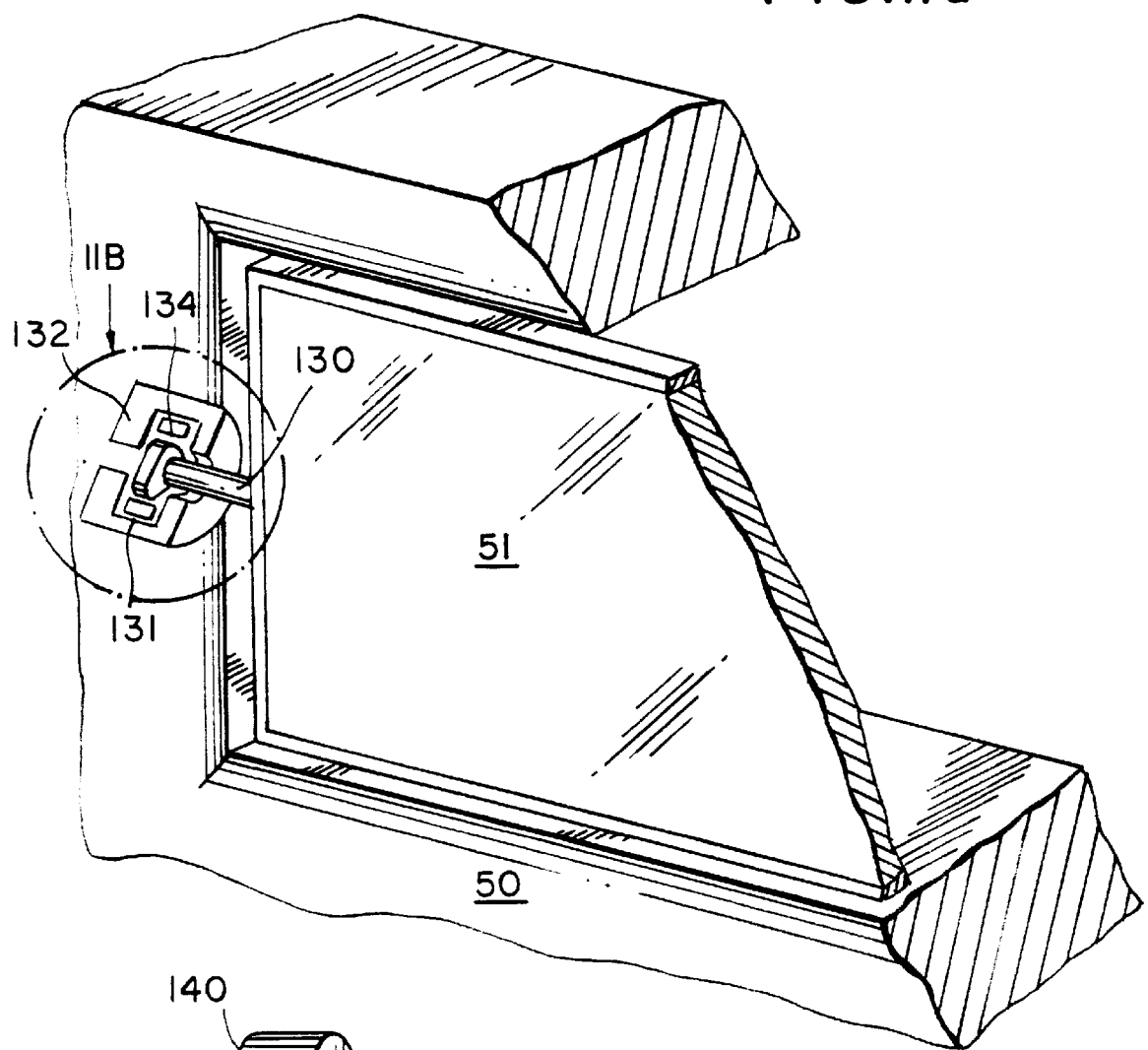
FIG. 11a is a partial view showing the pivot arrangement used in the embodiments of FIGS. 1a, 1b, 7a, 7b, 8a, 8b, 9a, 9b, 10a and 10b.
Figure 11B:
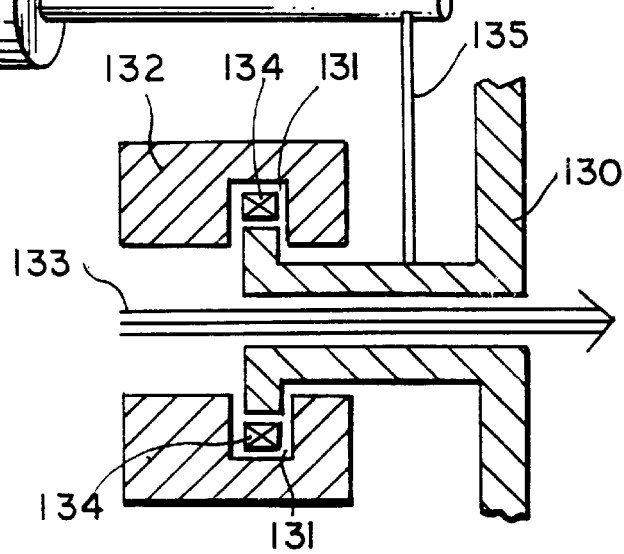

The screen 51 is pivotably mounted on the body 50 in the manner shown in FIGS. 11a and 11b. The screen 51 is formed as a screen unit mounted on a horizontal shaft or shaft pins 130 cooperating with an axle housing 132 in the body 50. Electronic wiring 133 to the screen from the body can, for example, pass within the shaft pins 130 if those pins are hollow. The shaft pins may cooperate with a resilient detent 134 to retain the screen in a desired orientation. Where the screen is an LCD screen it may be desirable not to apply pressure to the screen and it may be electronically adjustable by means of a motor 140 cooperating via a belt 135 with the shaft and controllable by, for example, up and down buttons provided on the body 50 (not shown). The screen 51 is shown pivoted centrally but, of course, it may be pivoted near either end, or at a position intermediate those points.

Figure 1E:
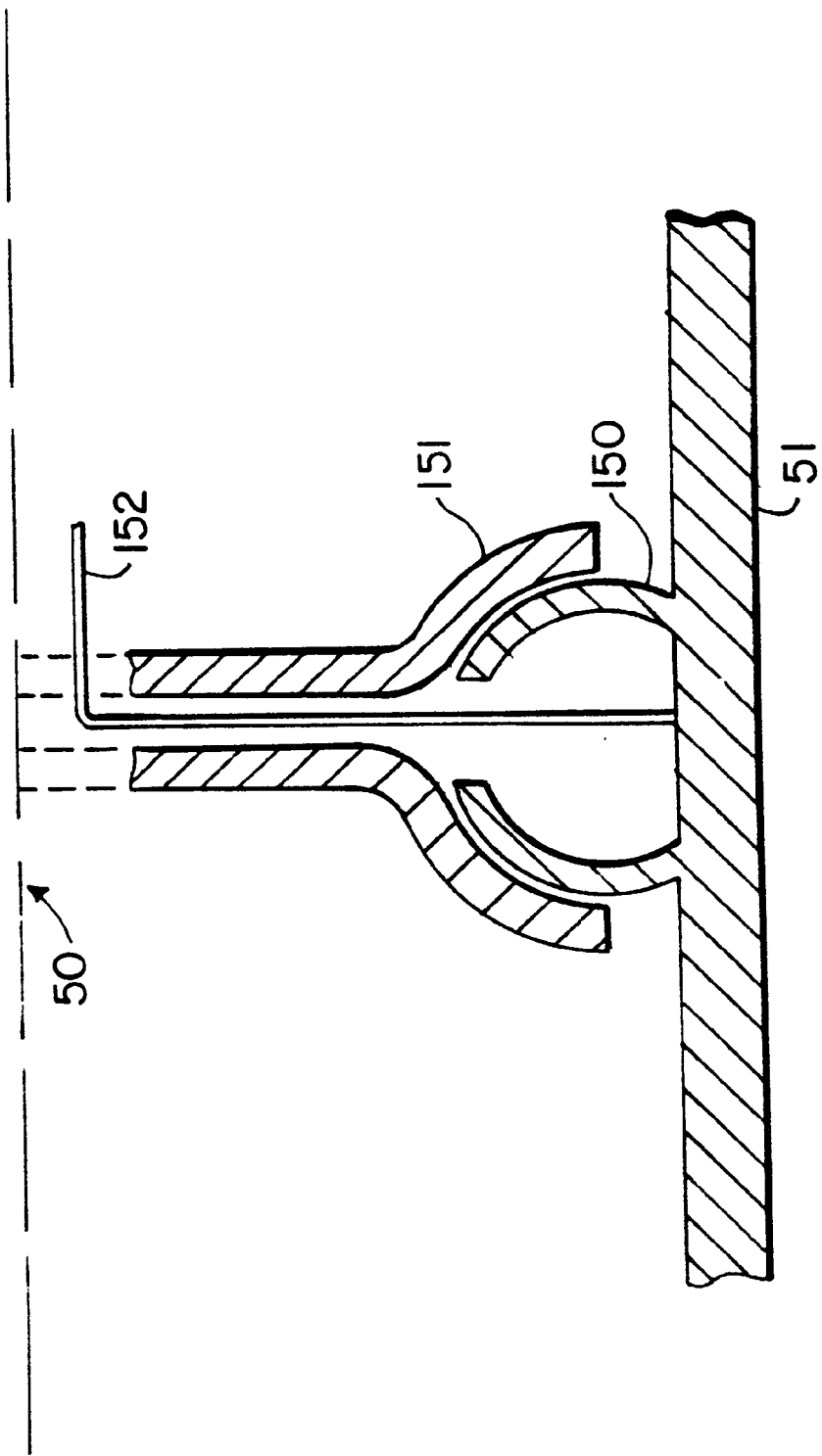
FIG. 1e shows the screen mounting for the apparatus of FIG. 1d.

FIGS. 1d and 1e show an alternative form of electronic apparatus of the type shown held by a user 56 in FIG. 1a. The principal components of the electronic apparatus are the same as in FIGS. 1d and 1c. The reader portion 52, however, comprises an elongate body provided at the front end of the body 50 having a reading window provided at one end and being pivotal about its vertically central axis as shown by arrow B. As a result the reader portion 52 can be placed in any desired orientation allowing simplified reading of bar code symbols 57 regardless of their positioning.

A further significant difference in the embodiment shown in FIG. 1d is that the screen 51 is arranged to be pivotal in both the x and y directions such that it can be adjusted to any desired position for yet easier user access. FIG. 1e demonstrates one possible manner of mounting the screen 51 relative to the body 50. A ball-type joint 150 extends from the rear of the screen 51 and is received in a correspondingly configured socket 151 extending from the body 50. Accordingly the ball 150 can be swivelled in the socket 151 such that any desired orientation of the screen 51 can be achieved. Wiring 152 to the screen 51 may pass within the socket 151 and through the ball 150 to the screen 51 allowing power and data to be supplied to the screen 51. Alternatively a gimbal arrangement may be adopted.

In the alternative arrangements described below with respect to FIGS. 7a, 7b, 8a, 8b, 9a, 9b, and 10a, 10b, the discussion will be restricted to bar code readers although it will be appreciated that any other electronic apparatus including a display screen and a light receiving portion can incorporate the features discussed. The pivot arrangement discussed in relation to FIGS. 11a and 11b is applicable to all the embodiments.

Figure 7B:
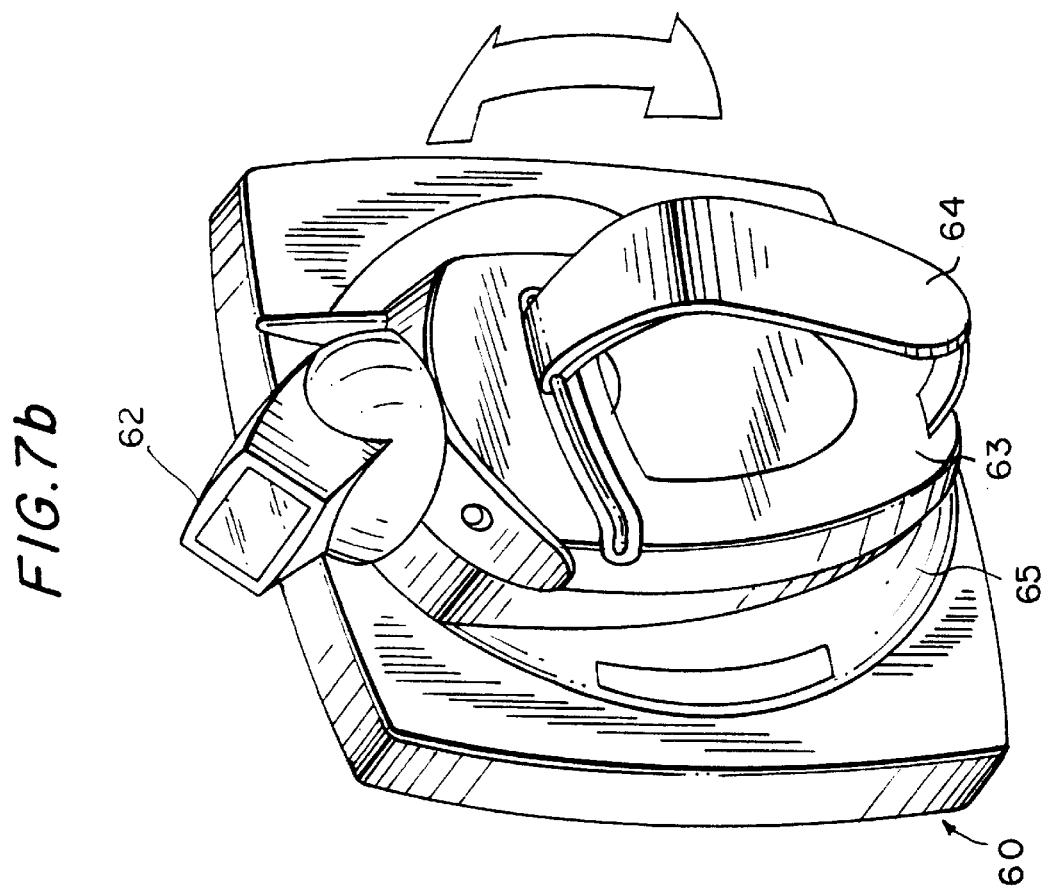
FIG. 7b is a perspective view of the embodiment of FIG. 7a from the other side.
Figure 7A:
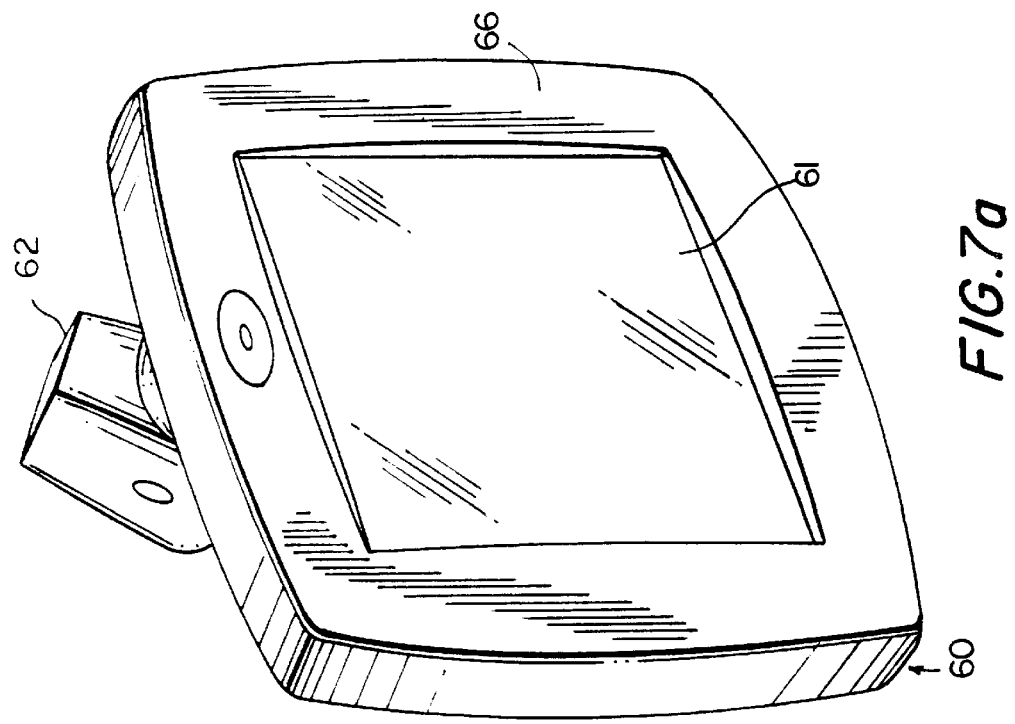
FIG. 7a is a perspective view of an electronic apparatus according to another embodiment of the invention from one side.

Turning firstly to FIGS. 7a and 7b a bar code reader 60 includes a display screen 61 and a bar code reader portion 62. The bar code reader portion 62 is mounted on a gripping portion 63 shaped to be held in the palm of the hand with the frontwardly facing part of the gripping portion 63 bearing the reader portion 62. A strap 64 is provided for retaining the bar code reader on the user's hand. The gripping portion 63 includes a turntable-type mounting portion 65 on which the display screen 61 and a body 66 in which it is provided, are mounted. The mounting portion 65 is provided on the upper face of the gripping portion 63, that is, the opposing face to that which is in contact with the user's palm in use.

In operation, the user grips the gripping portion 63 with his palm held horizontally such that the reading portion 62 faces away from the user. The screen 61 and screen body 66 then face upwardly towards the user. The orientation of the screen 61 can be changed for the user's ease of view by rotating it on the turntable-type mounting portion 65 about a vertical axis.

The reading portion is also preferably pivotably mounted at the front of the gripping portion about an axis which, in use, is vertical. The reading portion can thus be swept, in effect, from left to right or angled at a desired position accordingly.

Turning now to FIGS. 8a and 8b a bar code reader 70 includes a display screen 71 and a reader portion 72. A palm grip portion 73 carrying a strap 77 is provided on which the body 74 carrying the screen 71 is mounted in a turntable-type arrangement as described with reference to FIGS. 7a and 7b. In this embodiment, however, the reader portion 72 is mounted on the body portion 74 rather than the palm grip portion 73. The reader is arranged such that the palm grip portion 73 lies in the palm of the hand of the user with the reader portion 72 pointing forwardly and the screen 71 pointing upwardly. The screen is rotatable about a vertical axis to achieve a desired orientation and the reader portion 72 pivots about a vertical axis, sweeping from left to right in use. Controls 75 are provided so as to be actuable by the user's thumb and forefinger in use. The controls may be, for example, a trigger for actuating operation of the reader 72 or clockwise/anticlockwise controls for rotation of the screen 71 and/or of the reader portion 72. A pen 76 is also provided below the screen.

Figure 9B:
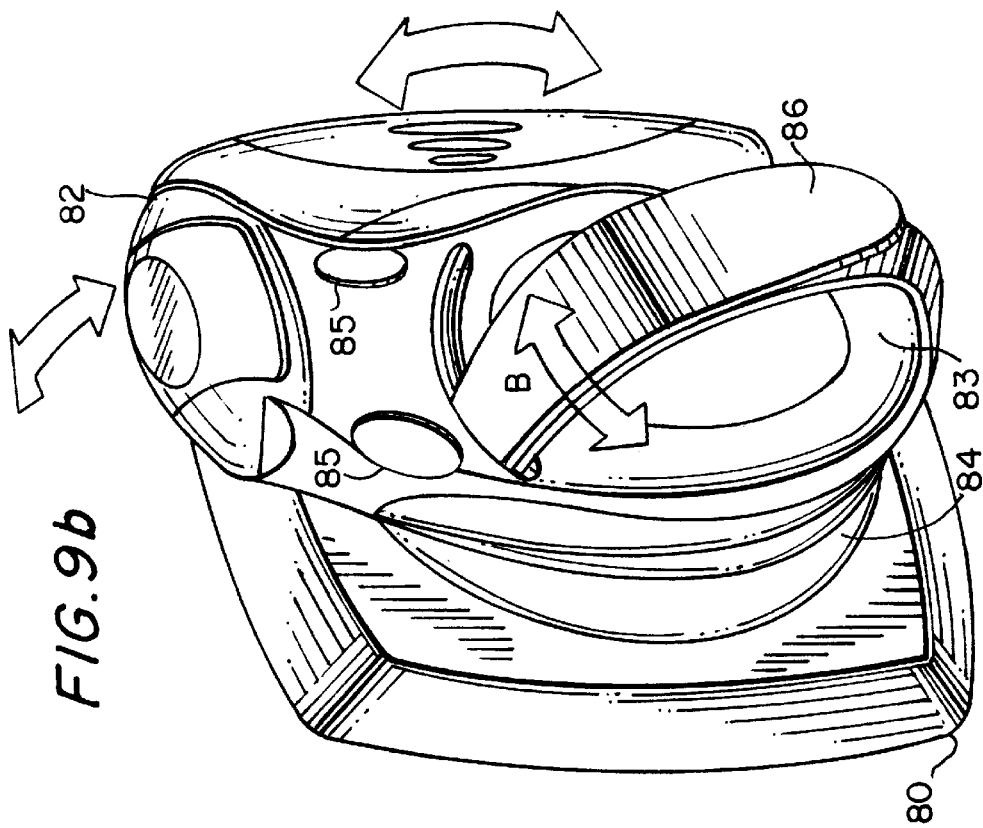
FIG. 9b is a perspective view of the embodiment of FIG. 9a from the other side.
Figure 9A:
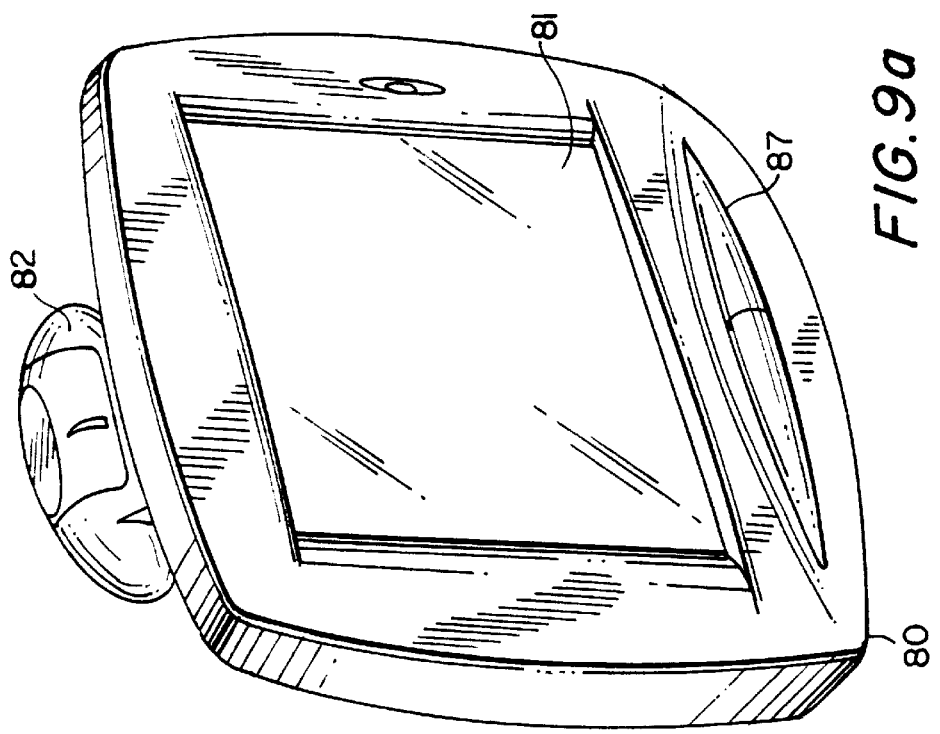
FIG. 9a is a perspective view of an electronic apparatus according to another embodiment of the invention from one side.

In FIGS. 9a and 9b a bar code reader 80 includes a screen 81 and a reader portion 82. A palm grip portion 83 is provided on which the reader portion 82 is mounted. The palm grip portion 83 includes a turntable-type mounting portion 84 allowing rotation of the screen about a vertical axis (in use) to a desired orientation. The reader portion 82 is mounted on a neck projecting forwardly from the palm grip portion and is arranged to pivot about a horizontal axis, in use, transverse to the direction in which it is pointed. Accordingly the reader portion scans up and down. Controls 85 are provided for actuation of the reader and/or motor driven rotation of the screen 81 and/or reader portion 82. The palm grip portion 83 is provided with a strap 86 which is movable in the direction shown by arrow B between two configurations for either left handed or right handed use. A pen 87 is also provided.

Figure 10B:
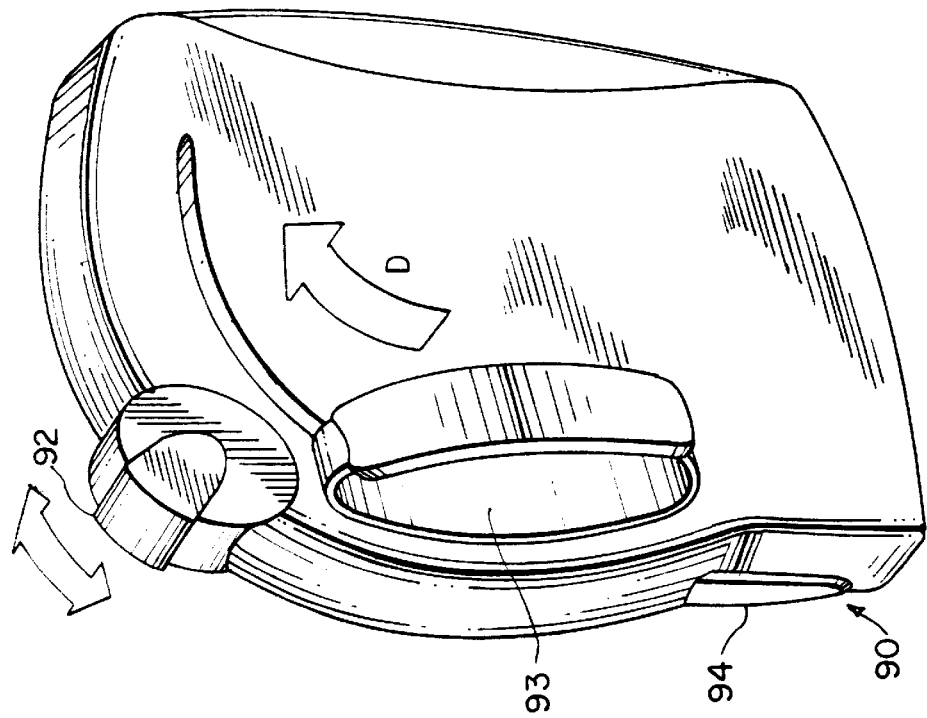
FIG. 10b is a perspective view of the embodiment of FIG. 10a from the other side.
Figure 10A:
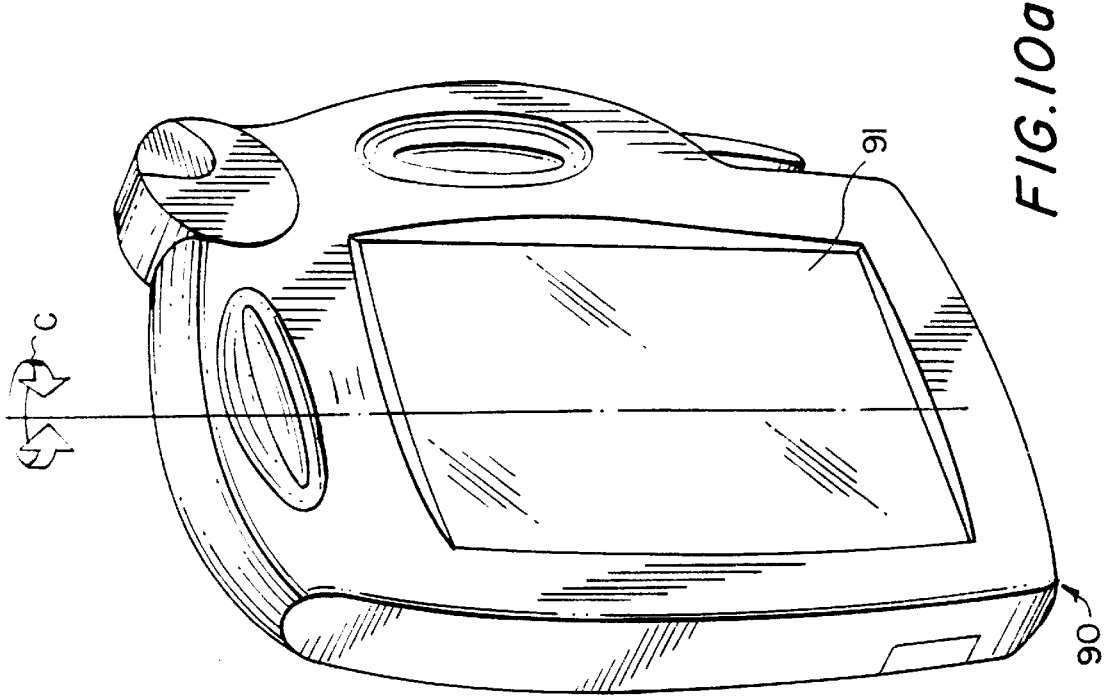
FIG. 10a is a perspective view of an electronic apparatus according to another embodiment of the invention from one side.

Referring to FIGS. 10a and 10b, a bar code reader 90 is shown including a screen 91 and a reader portion 92. The reader as a whole is substantially bar-shaped having two broad faces, the screen 91 being mounted on one of those faces and the other face contacting the user's palm when held by the user. The user holds his hand vertically and the reader portion is designed to point forwardly and downwardly from below the user's hand. Such an arrangement is particularly useful for reading bar code symbols close to the ground or any other relatively low surface. The reader portion 92 is arranged to pivot about an axis which is horizontal, in use, and transverse to the direction in which it points. The screen 91 may also be arranged to pivot, for example about a vertical axis (as designated by arrow C) allowing the reader to move it to its desired orientation. The reader includes a strap 93 which is movable in the direction of arrow D so as to accommodate the user's hand with the minimum of discomfort. A trigger 94 is provided for actuating the reader.

There are now discussed various improvements to a bar code reader, but it will be appreciated that those improvements could be equally well incorporated in the other types of electronic apparatus discussed herein.

Figure 2A:
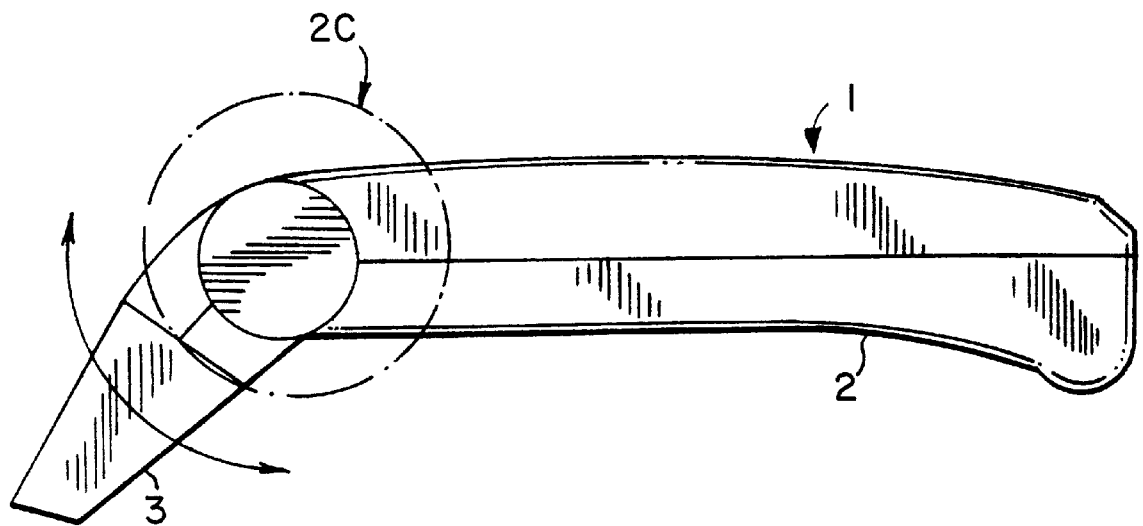
FIG. 2a is a side view of an optical reader according to another embodiment of the present invention.
Figure 2B:
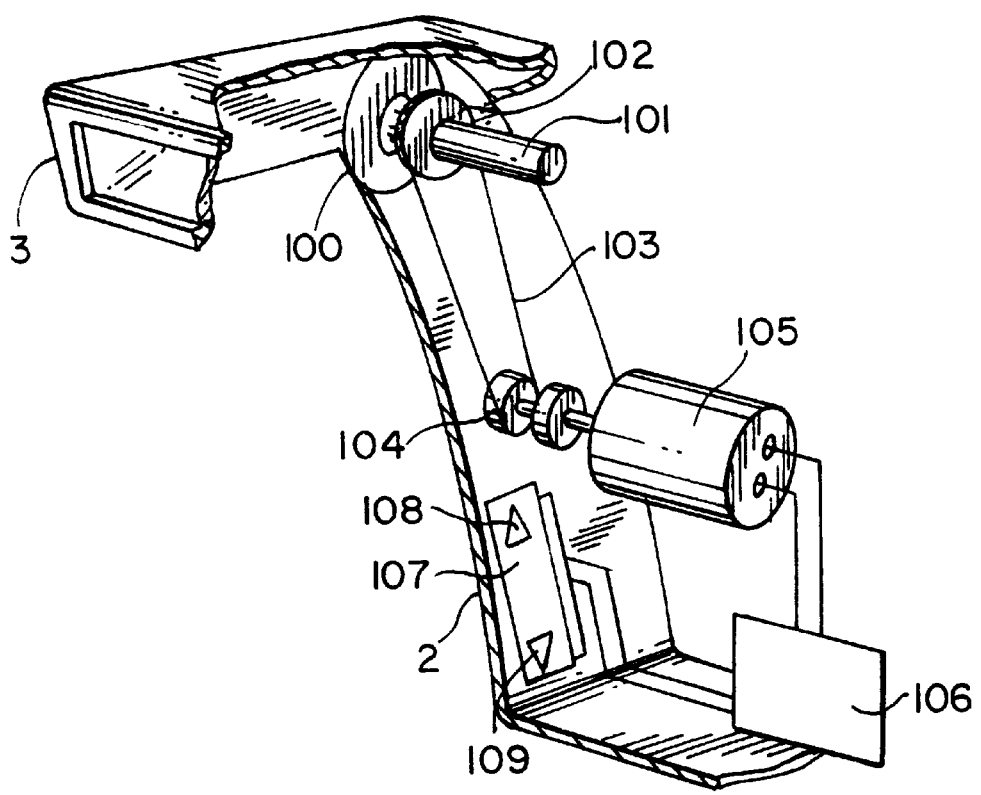

Referring now to FIGS. 2a, 2b and 3 a hand-held bar code reader shown generally as 1 includes a handle portion 2 and a head portion 3. The reader shown comprises a flying spot scanner including a light generating source such as a laser 4, a scanning mirror 5 and a light receiving element 6. The scanning mirror 5 oscillates rapidly to scan the light beam 7 generated by the laser source 4 across a bar code symbol 8. The workings of such a scanning system are well known in the art and it will be recognized that the "flying spot" arrangement could be replaced by a "field of view" arrangement wherein the beam 7 illuminates the whole of the bar code and a receiver 6 comprises a CCD.

The head portion 3 of the scanner is pivotally mounted relative to the handle portion 2 the pivoting axis being perpendicular to the longitudinal axis of the scanner. By pivoting about that axis the head portion 3 may be advantageously adjusted to positions particularly suitable for the scanning of awkwardly positioned bar code symbols. The pivoting arrangement may be achieved in various different ways, for example the head portion may include a cylindrical recess with gripping arms extending thereabout slidably mountable on a corresponding cylindrical portion of the handle portion 2. Alternatively the head portion may have an axle pivotable in a housing on the handle portion. A mirror 9 is provided and arranged to rotate as the head portion is rotated so as to direct the outgoing and incoming scanning beam between the light generating source 4, the light receiving element 6 and the bar code symbol 8.

Figure 4:
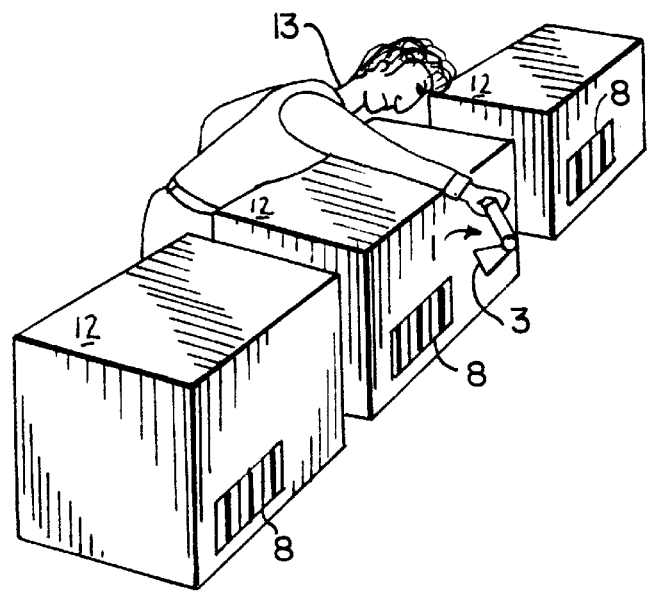
FIG. 4 is a cut-away side view of an alternative embodiment to that shown in FIG. 2.

In an alternative embodiment shown in FIG. 4 the light generating and receiving system 3,4,5,6 are provided in the pivoting head portion 3 of the bar code scanner and are connected to a controller 10 via suitable wiring 11, such as flexible ribbon wiring. It will be seen that the various components can be rearranged, certain components being found in the head portion and certain in the handle portion if required.

Figure 5:
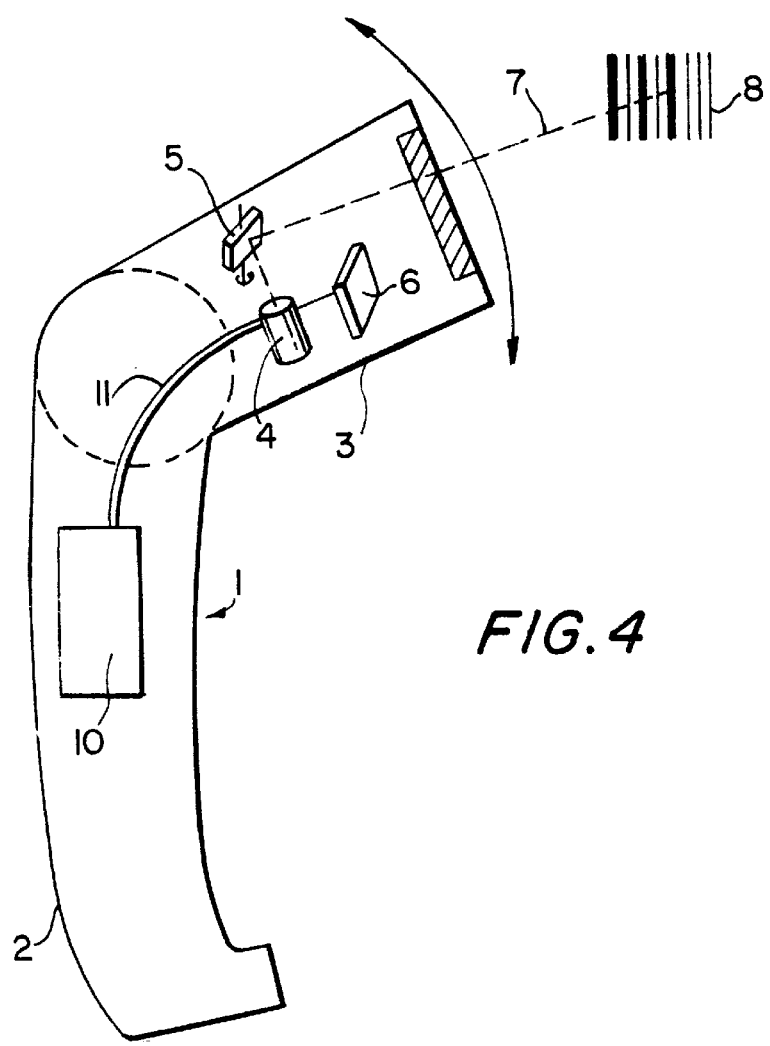
FIG. 5 illustrates a hand-held reader according to the present invention in use.

As the head portion 3 is pivotally mounted on the handle portion 2 the inclination of the head portion relative to the handle portion may be varied according to the application for which the scanner is used. For example, when inventorying is being carried out in relation to unwieldy or inaccessible goods 12, as shown in FIG. 5, allowing limited access to the bar code symbols it can be very difficult for the operator 13 to read the bar code symbols 8 without some discomfort. The problem can, however, be alleviated by using the hand-held scanner described above wherein the head portion 3 of the scanner has been pivoted to the appropriate angle. The inventorying process, therefore, is rendered more simple, fast and efficient.

A further embodiment of the invention is shown in FIG. 6. A fixed terminal 20, such as one that may be found at a point of sale includes a turret 21 on which a scanning head 22 is pivotally mounted. The angle of the pivoting head 22 may, therefore, be adjusted according to the physical requirements of the operator, for example dependent on whether the operator is standing or seated, or on the height or arm length of the operator.

Pivoting of the scanning head relative to the mounting portion may be achieved in various manners. For example the head may be pivoted manually by rotating it relative to the mounting portion or the head may be rotated automatically by means of a motor controlled by the operator to rotate the head to a desired angle. Such an arrangement is shown in FIG. 2b. The head portion 3 rotates about a pivot 100 on handle portion 2. The pivot axle 101 includes a drive disk 102 which may be toothed or otherwise configured to grip a drive belt 103. The drive belt runs around the drive disk 102 and also around a drive head 104 of a motor 105. The motor 105 is controlled by a control circuit shown schematically at 106 of any suitable known type and a manual drive control 107 is provided for the user. The manual drive control 107 shown includes a two-way button marked up (arrow 108) and down (109) but any suitable manual drive control can be used. Of course other types of motor drive may be incorporated. As shown in FIG. 2c, in addition, biasing means 120 secured to the mounting portion 2 by appropriate means such as rivet 121 can be provided to bear against the head portion 3 with force $F_1$ to such an extent that the head portion may be easily moved by applying a force $F_2$ to it but will be retained in a given position once the force is removed. In order to determine the angle through which the head has been rotated suitable calibrations 110 may be provided on the head portion 3 cooperating with an appropriate marking 111 on the mounting portion 2 to indicate the current angle. Alternatively electronic means may be provided for indicating the relative angle of the head and mounting portion.

It will be appreciated that the readers described above may be used in many other applications than those specifically set out. In addition other pivoting arrangements than those described above may be used, and the invention may be applied to any appropriate type of scanner. Furthermore arrangements other than pivoting arrangements can be provided, for example telescopic joints or flexible connections between the respective parts.

Without further analysis, the foregoing will so fully reveal the gist of the present invention that others can readily adapt to various applications without omitting features that, for the stand point of prior art, fairly constitute essential characteristics of the generic or specific aspects of the invention and, therefore, such adaptions should and are intended to be compounded within the meaning and range of equivalents of the following claims.

We claim:

1. An arrangement for electro-optically reading indicia, comprising:
   a) a housing having a first side extending across the user's palm during holding, and a second side opposite the first side and having frame portions;
   b) a reader supported by the housing, for directing a light beam at an indicium to be read, for detecting light reflected off the indicium over a field of view, and for scanning at least one of the light beam and the field of view;
   c) a handle on the housing for holding the housing in a user's hand, and for aiming the reader at the indicium; and
   d) a movable display including a generally planar screen framed by the frame portions, for visually displaying information to the user, the display being mounted on the second side of the housing for movement relative to the housing between a pair of end-limiting positions, the display being in constant view of the user in both end-limiting positions and from one end-limiting position to the other end-limiting position.

2. The arrangement as claimed in claim 1; and further comprising a strap attached to the first side of the housing and extending around the user's hand during holding.

3. The arrangement as claimed in claim 1, wherein the housing has a front face extending between the sides of the housing, and wherein the reader is mounted on the front face.

4. The arrangement as claimed in claim 3, wherein the reader includes a manually actuatable trigger mounted on the front face for initiating reading.

5. The arrangement as claimed in claim 3, wherein the reader includes a window mounted on the front face, and wherein the light beam and the reflected light pass through the window during reading.

6. The arrangement as claimed in claim 1, wherein the housing extends lengthwise along a longitudinal axis, and wherein the display is mounted on the housing for pivoting movement along a pivot axis generally parallel to the longitudinal axis.

7. The arrangement as claimed in claim 1, wherein the housing includes a spherical socket, and wherein the display includes a ball mounted in the socket for swiveling the display along multiple directions.

8. The arrangement as claimed in claim 1, wherein the reader is mounted on the housing for movement relative to the housing.

9. An arrangement for electro-optically reading indicia, comprising:
   a) a housing having a first side extending across the user's palm during holding, a second side opposite the first side, and a front face extending between the sides of the housing;
   b) a reader mounted on the front face of the housing, for directing a light beam at an indicium to be read, for detecting light reflected off the indicium over a field of view, and for scanning at least one of the light beam and the field of view, the reader including a manually actuatable trigger mounted on the front face for initiating reading;
   c) a handle on the housing for holding the housing in a user's hand, and for aiming the reader at the indicium; and
   d) a movable display for visually displaying information to the user, the display being mounted on the second side of the housing for movement relative to the housing between a pair of end-limiting positions, the display being in constant view of the user in both end-limiting positions and from one end-limiting position to the other end-limiting position.

10. The arrangement as claimed in claim 9, wherein the housing extends lengthwise along a longitudinal direction, and wherein the reader is pivotably mounted on the housing for movement about the longitudinal axis.

11. The arrangement as claimed in claim 9, wherein the display includes a generally planar screen, and wherein the reader is turnably mounted on the housing for turning movement about an axis perpendicular to the screen.

12. An arrangement for electro-optically reading indicia, comprising:
   a) a housing extending lengthwise along a longitudinal axis;
   b) a reader supported by the housing, for directing a light beam at an indicium to be read, for detecting light reflected off the indicium over a field of view, and for scanning at least one of the light beam and the field of view;
   c) a handle on the housing for holding the housing in a user's hand, and for aiming the reader a the indicium; and
   d) a movable display for visually displaying information to the user, the display being mounted on the housing for pivoting movement along a pivot axis generally parallel to the longitudinal axis relative to the housing between a pair of end-limiting positions, the display being in constant view of the user in both end-limiting positions and from one end-limiting position to the other end-limiting position.

13. The arrangement as claimed in claim 12, wherein the housing has a first side extending across the user's palm during holding, and a second side opposite the first side; and wherein the movable display is mounted on the second side.

14. The arrangement as claimed in claim 13, wherein the display includes a generally planar screen, and wherein the second side has frame portions extending around and framing the screen.

15. The arrangement as claimed in claim 12, wherein the housing includes a bearing, and wherein the display includes a hollow shaft journaled by the bearing; and further comprising electrical conductors extending from the reader through the hollow shaft to the display.

16. The arrangement as claimed in claim 15; and further comprising a motor operatively connected to the shaft for turning the shaft and the display to a desired angular position relative to the pivot axis.

17. The arrangement as claimed in claim 12, wherein the display has a central axis of symmetry, and wherein the pivot axis is co-linear with the central axis.

18. An arrangement for electro-optically reading indicia, comprising:
   a) a housing having a spherical socket;
   b) a reader supported by the housing, for directing a light beam at an indicium to be read, for detecting light reflected off the indicium over a field of view, and for scanning at least one of the light beam and the field of view;
   c) a handle on the housing for holding the housing in a user's hand, and for aiming the reader at the indicium; and
   d) a movable display for visually displaying information to the user, the display including a ball mounted in the socket on the housing for swiveling movement relative to the housing along multiple directions between a pair of end-limiting positions, the display being in constant view of the user in both end-limiting positions and from one end-limiting position to the other end-limiting position.

19. An arrangement for electro-optically reading indicia, comprising:
   a) a housing;
   b) a reader turnably mounted on the housing for turning movement about an axis, for directing a light beam at an indicium to be read, for detecting light reflected off the indicium over a field of view, and for scanning at least one of the light beam and the field of view;
   c) a handle on the housing for holding the housing in a user's hand, and for aiming the reader at he indicium; and
   d) a movable display including a generally planar screen lying perpendicular to the axis, for visually displaying information to the user, the display being mounted on the housing for movement relative to the housing between a pair of end-limiting positions, the display being in constant view of the user in both end-limiting positions and from one end-limiting position to the other end-limiting position.

20. An arrangement for electro-optically reading indicia, comprising:
   a) a housing having a first side extending across the user's palm during holding, and a second side opposite the first side and having frame portions;
   b) a reader mounted on the housing for movement relative to the housing, for directing a light beam at an indicium to be read, for detecting light reflected off the indicium over a field of view, and for scanning at least one of the light beam and the field of view;
   c) a handle on the housing for holding the housing in a user's hand, and for aiming the reader at the indicium; and
   d) a movable display including a generally planar screen framed by the frame portions, for visually displaying information to the user, the display being mounted on the second side of the housing for movement relative to the housing between a pair of end-limiting positions, the display being in constant view of the user in both end-limiting positions and from one end-limiting position to the other end-limiting position.

* * * * *